2,992,167
METHOD OF EXTRACTING CATALASE FROM LIVER
Hans E. Dan, Wauwatosa, Wis., assignor to Chr. Hansen's Laboratory, Inc., Milwaukee, Wis., a corporation of New York
No Drawing. Filed Feb. 27, 1959, Ser. No. 795,911
7 Claims. (Cl. 195—66)

This present invention relates generally to the preparation of a catalase extract from liver, and it relates more specifically to such preparation of a catalase containing extract suitable for food processing and pharmacological use.

It is the primary object of this invention to provide an improved method of preparing a catalase extract from liver, which is economical and involves the use of only simple equipment, while still giving a high yield of catalase.

It is a further important object of the present invention to provide such a method which is especially adapted for large scale commercial operation and usage.

These and other more specific objects and advantages of the invention will be apparent from the following detailed description.

The basic material preferably utilized in the present improved catalase extraction method is mammalian liver. In general, beef liver is preferred, as it is a very good source of catalase.

The liver may be used either fresh from the slaughter-house or frozen. In practice, it will often be found most desirable to use frozen liver as freezing does not harm the catalase in the tissue and prevents autolyses and rapid decomposition of the liver.

As an initial step, it is desirable to comminute or convert the liver into pulp by grinding, cutting or by any other suitable method.

To the comminuted liver sufficient solvent from the group of aliphatic mono-alcohols containing 4 carbon atoms, such as butanol should then be added, preferably in amounts sufficient to produce a concentration of at least 10% by volume. Usually it will be found that a butanol concentration of about 20% by volume is most advantageous, and the butanol should be well mixed with the tissue. The process may proceed as soon as the butanol and the tissue have been thoroughly mixed, but the time element is not critical and the mixture can be left alone for several hours without any appreciable loss of catalase. The butanol employed in this step may be any of the isomers of butanol, that is, normal, or secondary, or iso, or tertiary butanol, but it is preferable to use either normal or iso butanol.

Chlorinated hydrocarbon should thereafter be added and stirred into the mixture of butanol and communited liver, preferably in an amount of at least 5% by volume. As a chlorinated hydrocarbon, chloroform is preferable and the volume used should be about equal to the volume of butanol previously added to produce the initial mixture.

When the chlorinated hydrocarbon has been stirred into the mixture, the bulk of the protein impurities will be denatured and precipitated. This takes place without influencing the catalase, but it causes a separation of the tissue fluid in which the catalase is dissolved. It is most advantageous to first add water for extraction at this point, because if such water is added at the start of the procedure, it is necessary to use correspondingly larger amounts of organic solvent.

The amount of water added is preferably kept as small as possible while still being consistent with complete extraction. Preferably 1 to 3 volumes of water are used based on the initial volume of the tissue, but a higher amount can, however, be used without adverse effect.

The final extraction is complete in a very short period of time under the conditions above described, and a period of from thirty minutes to two hours is ordinarily sufficient. The extraction period should not be extended much longer than necessary as the stability of catalase diminishes somewhat in the presence of such solvent mixture; and as a result of the denaturation of protein by the organic solvents, the extract may be readily separated by filtration, centrifugation or pressing.

The pH during the extraction should preferably be between 6 and 7. This is close to the natural pH of liver tissue, so that normally, no adjustment is required. When necessary, however, pH can be adjusted by adding acidic or alkaline reagents depending on the initial pH.

The procedure above described may be carried out at room temperature, that is, at from 15°–25° C. thus obviating the need for costly refrigeration; and it should also be noted the beneficial results of the invention are not dependent upon any violent agitation during the mixing operations. The results are best when only mild but thorough mixing is used.

The catalase in the extract prepared by the improved procedure described above may be precipitated by the addition of acetone sufficient to produce an acetone concentration in the range 30% to 50%, and the precipitate after separation can conveniently be dissolved in buffer or salt solution to give an extract of catalase of the desired strength for commercial use.

The process is further illustrated by the following practical example:

10 lbs. of ground beef liver are mixed at room temperature with 900 ml. of normal butyl alcohol. After mild stirring and thorough mixing of the mass for 10 minutes, 900 ml. of chloroform are added while again mixing, and after 10 additional minutes, 4500 ml. of water are first added to the mass. This mixture is left for extraction for two hours with occasional stirring, after which time it is poured in canvas bags and the extract pressed out on a hydraulic press or the like. The total volume of extract is 6600 ml., 260 ml. of which are organic phase and are discarded. The slightly hazy brown extract is precipitated with 4400 ml. of acetone and the precipitate which contains catalase as well as protein impurities, is separated with the aid of a centrifuge. The catalase is dissolved by suspending the precipitate in one liter of 5% salt brine. Most of the protein impurities stay undissolved and are removed by centrifugation after two hours. The centrifugate is then ready for finishing and standardizing to commercial strength.

In the foregoing, I have explained my improved method in considerable detail. It will however be apparent to those skilled in the art, that modifications of many of the details set forth within the scope of the appended claims, can be made without departing from the spirit of the invention.

I claim:

1. A method of extracting substantially pure catalase from mammalian liver comprising the following steps: treating a volume of comminuted mammalian liver tissue by admixing therewith alcohol selected from the class consisting of normal butyl alcohol, secondary butyl alcohol, isobutyl alcohol, and tertiary butyl alcohol, thereafter admixing chloroform with said liver tissue and alcohol, and thereafter introducing water into the mixture of alcohol, chloroform and comminuted liver tissue to extract catalase therefrom, said method being carried out at substantially the initial pH of the natural liver tissue.

2. A method of separating catalase from mammalian liver comprising the following steps: treating a volume of comminuted mammalian liver tissue by admixing therewith an alcohol selected from the class consisting of normal butyl alcohol, secondary butyl alcohol, isobutyl alcohol, and tertiary butyl alcohol, thereafter admixing chloroform with said liver tissue and alcohol, thereafter introducing water into the mixture of alcohol, chloroform and comminuted liver tissue to extract catalase therefrom, and mixing the separated extract with acetone to precipitate the catalase from said extract, said steps being effected while maintaining the pH at a value ranging between 6 and 7.

3. A method of separating catalase from mammalian liver comprising the following steps: treating a volume of comminuted mammalian liver tissue by admixing therewith an alcohol selected from the class consisting of normal butyl alcohol and isobutyl alcohol, thereafter admixing chloroform with said liver tissue and alcohol, and thereafter introducing water into the mixture of alcohol, chloroform and comminuted liver tissue to extract catalase therefrom, said method being carried out at substantially the initial pH of the natural liver tissue.

4. A method of separating catalase from mammalian liver comprising the following steps: treating a volume of comminuted mammalian liver tissue by admixing therewith an alcohol selected from the class consisting of normal butyl alcohol, secondary butyl alcohol, isobutyl alcohol, and tertiary butyl alcohol in an amount of at least 10 percent by volume based on the amount of said liver tissue, thereafter admixing with said liver tissue and alcohol, chloroform in an amount of at least 5 percent, and thereafter introducing water into the mixture of alcohol, chloroform and liver tissue to extract catalase therefrom, said steps being effected while maintaining the pH at a value ranging between 6 and 7.

5. A method of separating catalase from mammalian liver comprising the following steps: treating a volume of comminuted mammalian liver tissue by admixing therewith an alcohol selected from the class consisting of normal butyl alcohol, secondary butyl alcohol, isobutyl alcohol, and tertiary butyl alcohol, in amount of 10 to 20 percent per volume based on the amount of said liver tissue, thereafter admixing with said liver tissue and alcohol, chloroform in amount of 5 to 20 percent, thereafter introducing water in amount of 1 to 3 volumes based on the amount of said liver tissue, into the mixture of alcohol, chloroform and liver tissue to extract catalase therefrom, and mixing the separated extract with acetone to precipitate catalase from said extract, said steps being effected while maintaining the pH at a value ranging between 6 and 7.

6. A method of separating catalase from mammalian liver comprising the following steps: treating a volume of comminuted mammalian liver tissue by admixing therewith normal butyl alcohol in amount of 10 to 20 percent by volume based on the amount of said liver tissue, thereafter admixing with said liver tissue and normal butyl alcohol, chloroform in an amount substantially equal to the amount of normal butyl alcohol, thereafter introducing water in amount of 1 to 3 volumes based on the amount of said liver tissue, into the mixture of normal butyl alcohol, chloroform and liver tissue to extract catalase therefrom, allowing the resulting mixture to stand for an extraction period while being periodically mildly agitated, and mixing the separated extract with acetone to precipitate catalase from said extract, said steps being effected while maintaining the pH at a value ranging between 6 and 7.

7. A method of separating catalase from mammalian liver comprising the following steps: treating a volume of comminuted mammalian liver tissue by admixing therewith an alcohol selected from the class consisting of normal butyl alcohol, secondary butyl alcohol, isobutyl alcohol and tertiary butyl alcohol, thereafter admixing chloroform with said liver tissue and alcohol, and thereafter introducing water into the mixture of alcohol, chloroform and comminuted liver tissue to extract catalase therefrom, said steps being effected while maintaining the pH at a value ranging between 6 and 7.

References Cited in the file of this patent

UNITED STATES PATENTS 2,834,713    Robbins _____ May 13, 1958

OTHER REFERENCES

Advances in Protein Chemistry, vol. 2 (1945), article by Meyer, pp. 249 to 275, page 254 particularly relied on.

Morton: "Nature," December 30, 1950, pp. 1092–1095.

Mosiman: "Archives of Biochemistry and Biophysics," vol. 33, page 487 (1951).

Sumner and Somers: "Chemistry and Methods of Enzymes," page 220 (1953).